United States Patent
Liu et al.

(10) Patent No.: US 11,120,537 B2
(45) Date of Patent: Sep. 14, 2021

(54) COGNITIVE OBJECT EMOTIONAL ANALYSIS BASED ON IMAGE QUALITY DETERMINATION

(71) Applicant: International Business Machines Corporation, Armonk, NY (US)

(72) Inventors: Su Liu, Austin, TX (US); Manjunath Ravi, Austin, TX (US); Kai Liu, Malden, MA (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 16/582,899

(22) Filed: Sep. 25, 2019

(65) Prior Publication Data

US 2021/0090233 A1    Mar. 25, 2021

(51) Int. Cl.
| | |
|---|---|
| G06T 7/00 | (2017.01) |
| G06K 9/00 | (2006.01) |
| G06F 16/583 | (2019.01) |
| G06F 16/51 | (2019.01) |

(52) U.S. Cl.
CPC ............ *G06T 7/0002* (2013.01); *G06F 16/51* (2019.01); *G06F 16/5854* (2019.01); *G06K 9/00677* (2013.01); *G06K 9/00288* (2013.01); *G06K 2209/27* (2013.01); *G06T 2207/30168* (2013.01)

(58) Field of Classification Search
CPC ...... G06F 16/51; G06F 16/55; G06F 16/5854; G06K 2209/27; G06K 9/00288; G06K 9/00677; G06T 2207/30168; G06T 7/0002
See application file for complete search history.

(56) References Cited

U.S. PATENT DOCUMENTS

| | | |
|---|---|---|
| 9,774,779 B2 | 9/2017 | Petrescu et al. |
| 9,807,301 B1 | 10/2017 | Weisberg et al. |
| 2014/0250110 A1 | 9/2014 | Yang et al. |

(Continued)

FOREIGN PATENT DOCUMENTS

WO    2005096613 A1    10/2005

OTHER PUBLICATIONS

Marchesotti et al., "Discovering Beautiful Attributes for Aesthetic Image Analysis," International Journal of Computer Vision, vol. 113, No. 3, Jul. 2015, pp. 1-22.

(Continued)

*Primary Examiner* — Manuchehr Rahmjoo
(74) *Attorney, Agent, or Firm* — Zilka-Kotab, P.C.

(57) ABSTRACT

According to one embodiment, a computer-implemented method includes collecting data corresponding to an image of one or more objects captured by a user on an image capture device, wherein the data comprises biometric data, emotion data, image quality data, and context data. In addition, the computer-implement method includes determining an image quality (IQ) value based on the image quality data, determining an emotion (E) value based on at least one of the biometric data and the emotion data, and determining a relationship (R) value between the one or more objects and the user based on the context data. The computer-implement method includes calculating an Overall Emotional Image Quality Score (OEIQS) for the image based on the IQ value, the E value, and the R value, and categorizing the image into at least one of a plurality of predefined categories.

17 Claims, 10 Drawing Sheets

(56) References Cited

U.S. PATENT DOCUMENTS

| | | |
|---|---|---|
| 2015/0178915 A1 | 6/2015 | Chatterjee et al. |
| 2016/0239519 A1* | 8/2016 | Levy .................... G06T 5/003 |
| 2017/0046017 A1 | 2/2017 | Bhide et al. |

OTHER PUBLICATIONS

Vijay, M., "Best Duplicate Photo Finder and Remover to Clean Duplicate Images," SYSTWEAK, Aug. 14, 2019, 2 pages, retrieved from https://blogs.systweak.com/5-duplicate-photo-finder-tools-to-delete-duplicate-photos/.

Smith, M., Taking out the Garbage-7 Tips for Choosing Your Best Photos Fast, Digital Photography School, accessed on Aug. 15, 2019, 3 pages, retrieved from https://digital-photography-school.com/taking-out-the-garbage-7-tips-for-choosing-your-best-photos-fast/.

Murphy, J., "Deep Learning Frameworks: A Survey of TensorFlow, Torch, Theano, Caffe, Neon, and the IBM Machine Learning Stack," Microway, Jan. 13, 2016, 16 pages, retrieved from https://www.microway.com/hpc-tech-tips/deep-learning-frameworks-survey-tensorflow-torch-theano-caffe-neon-ibm-machine-learning-stack/.

* cited by examiner

COGNITIVE OBJECT EMOTIONAL ANALYSIS BASED ON IMAGE QUALITY DETERMINATION

BACKGROUND

The present invention relates to a method of processing and selecting images, and more specifically, this invention relates to managing object emotional analysis of images in real time.

With the ease of photography using smart phones and related devices, people tend to take multiple photos of same objects under similar conditions (e.g., time, location, environment, etc.), and then review the photos, select the best photo, and share the selected photo. However, this laborious method includes the photographer taking time to sort and delete duplicate photographic images from the device (e.g., camera, smart phone, etc.).

Conventional automated image selection based on image quality may not select the best image if the images are captured from a single device at the same time. The photographer often retains duplicate photos with the reservation that an ideal moment may be missed or deleting a good photo. Consequently, the photographer tends to find it difficult to determine the best photo from multiple photos taken at the same time. Moreover, the process of deleting redundant photos is time consuming. For instance, the photographer tends to spend an excess of time reviewing the photos and comparing each photo to similar photos in a series.

In addition, a user (e.g., owner of the image capture device, camera, photographer, etc.) may have a large number of images stored on the device (e.g., camera, smart phone, computer storage, etc.) where many of the images are similar in context, subject, emotion, relationship, etc.

There is a need to develop an automated image selection system that quantifies image qualities including emotional factors of the objects of the images and relationship factors involving the photographer and the objects of the images.

SUMMARY

According to one embodiment, a computer-implemented method includes collecting data corresponding to an image of one or more objects captured by a user on an image capture device, wherein the data comprises biometric data, emotion data, image quality data, and context data. In addition, the computer-implement method includes determining an image quality (IQ) value based on the image quality data, determining an emotion (E) value based on at least one of the biometric data and the emotion data, and determining a relationship (R) value between the one or more objects and the user based on the context data. The computer-implement method includes calculating an Overall Emotional Image Quality Score (OEIQS) for the image based on the IQ value, the E value, and the R value, and categorizing the image into at least one of a plurality of predefined categories.

According to another embodiment, a computer-implemented method includes receiving from a device an image of one or more objects captured by a user on an image capture device, where the image has metadata comprising biometric data, emotion data, image quality data, and context data. In addition, the computer-implemented method includes determining an Image Quality (IQ) value based on the image quality data, determining an emotion (E) value based on at least one of the biometric data and the emotion data, and determining a relationship (R) value between the one or more objects and the user based on the context data. The computer-implemented method includes calculating an Overall Emotional Image Quality Score (OEIQS) for the image using the IQ value, the E value, and the R value, and categorizing the image into at least one of a plurality of predefined categories.

Other aspects and embodiments of the present invention will become apparent from the following detailed description, which, when taken in conjunction with the drawings, illustrate by way of example the principles of the invention.

BRIEF DESCRIPTIONS OF DRAWINGS

DETAILED DESCRIPTION

Figure 1:
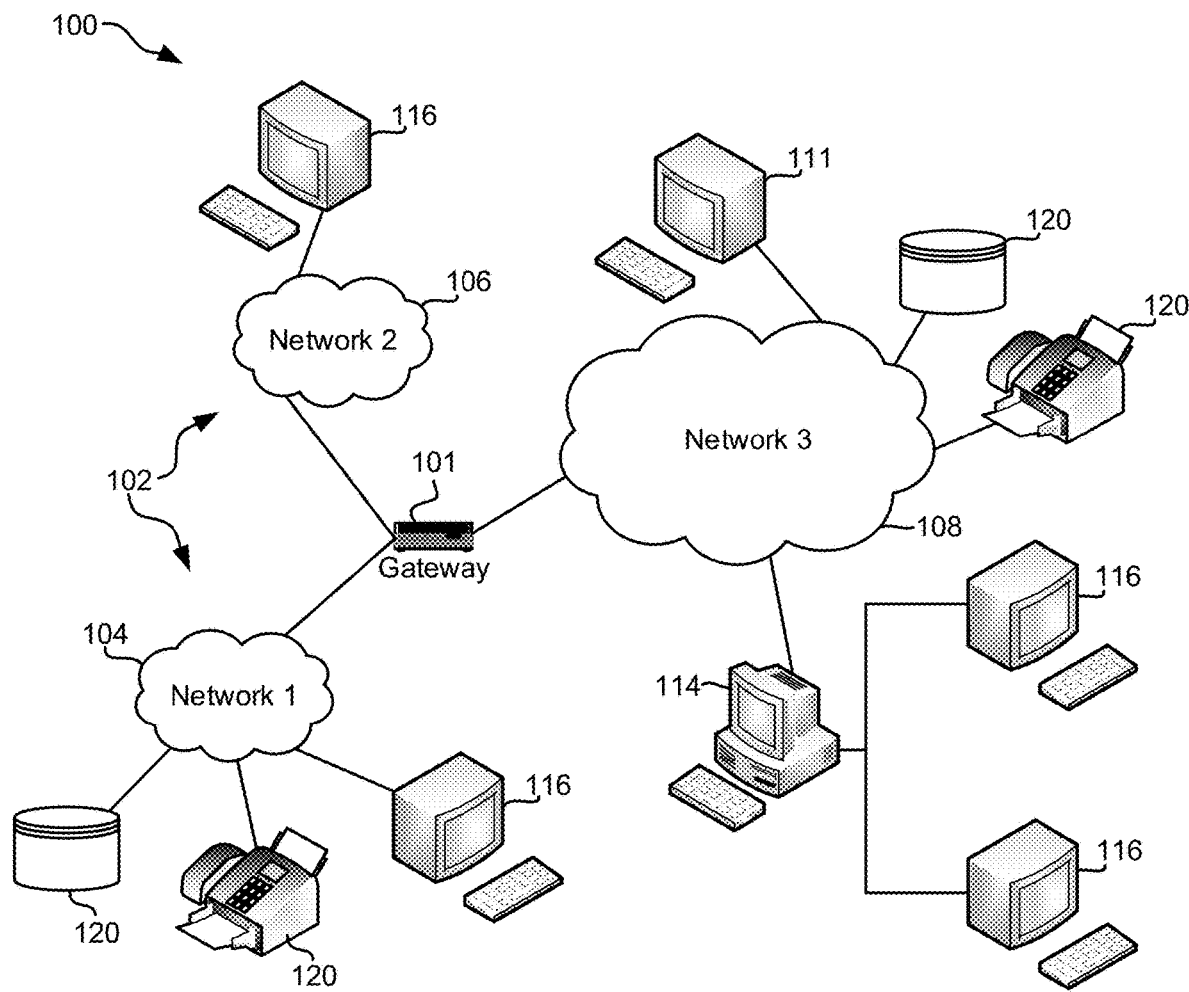
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for a method of cognitive object emotional analysis (OEA) based on the best image determination for dynamically removing duplicated photos from a database.

In one general embodiment, a computer-implemented method includes collecting data corresponding to an image of one or more objects captured by a user on an image capture device, wherein the data comprises biometric data, emotion data, image quality data, and context data. In addition, the computer-implement method includes determining an image quality (IQ) value based on the image quality data, determining an emotion (E) value based on at least one of the biometric data and the emotion data, and determining a relationship (R) value between the one or more objects and the user based on the context data. The computer-implement method includes calculating an Overall Emotional Image Quality Score (OEIQS) for the image based on the IQ value, the E value, and the R value, and categorizing the image into at least one of a plurality of predefined categories.

In another general embodiment, a computer-implemented method includes receiving from a device an image of one or more objects captured by a user on an image capture device, where the image has metadata comprising biometric data, emotion data, image quality data, and context data. In addition, the computer-implemented method includes determining an Image Quality (IQ) value based on the image quality data, determining an emotion (E) value based on at least one of the biometric data and the emotion data, and determining a relationship (R) value between the one or more objects and the user based on the context data. The computer-implemented method includes calculating an Overall Emotional Image Quality Score (OEIQS) for the image using the IQ value, the E value, and the R value, and categorizing the image into at least one of a plurality of predefined categories.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
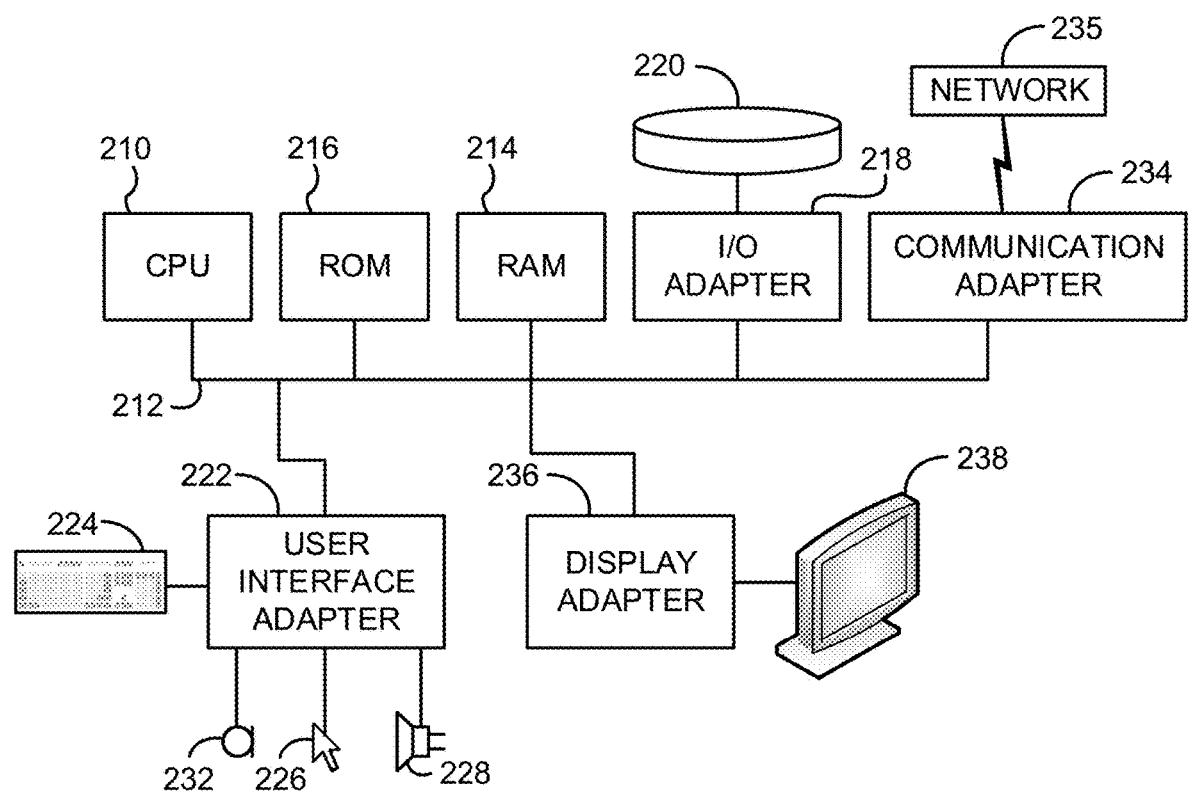
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
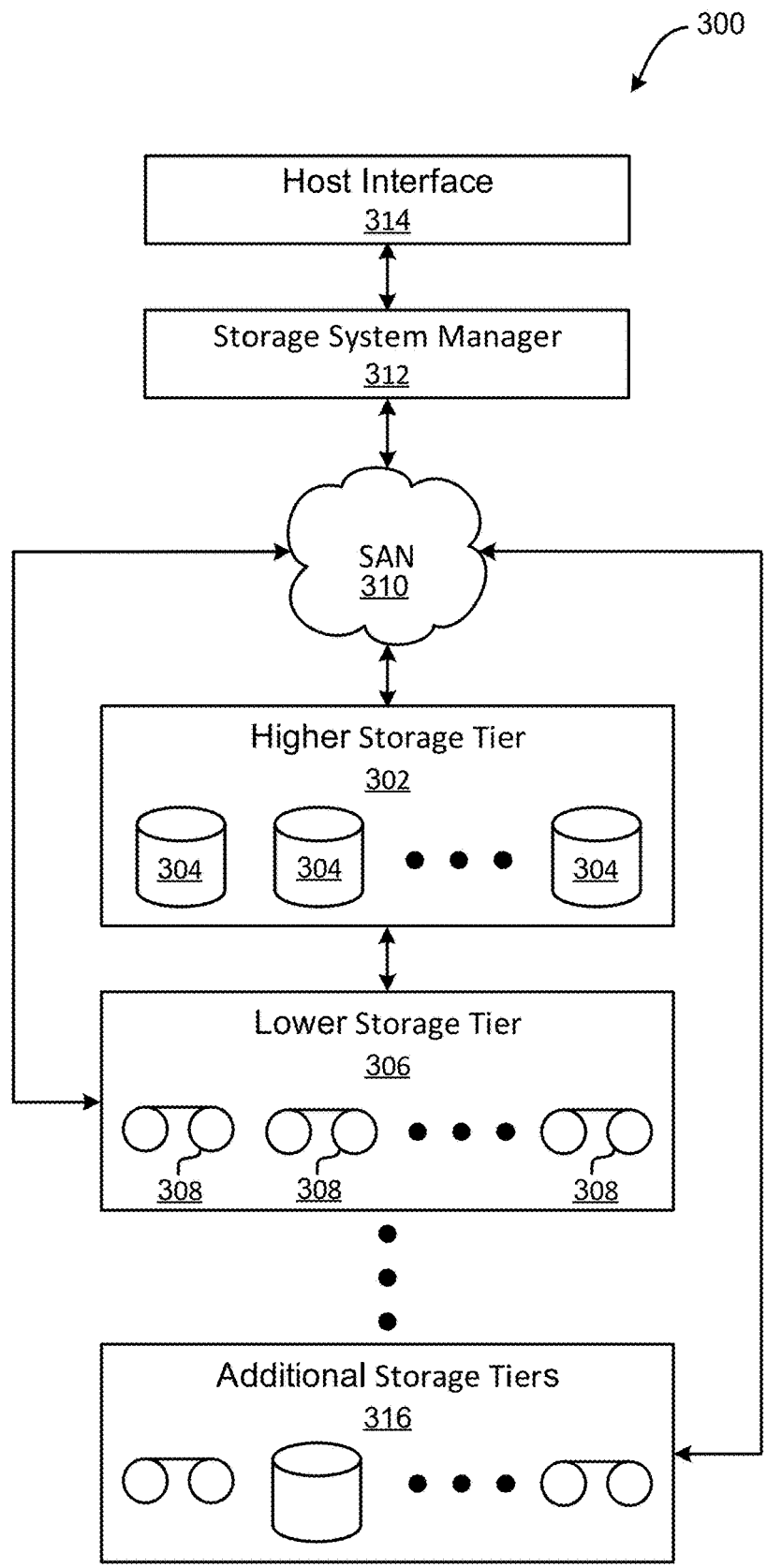
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of ordinary skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of ordinary skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Various embodiments described herein define a method of cognitive object emotional analysis (OEA) based on best image determination for dynamically removing duplicated photos from a database. In one approach, a context aware framework may be defined for cognitively managing duplicate images. In one approach, a cognitive OEA data structure may be defined to track context of an event to be photographed, emotion of objects to be photographed, relationship between objects of the image and the photographer, and related data to photography event. In one approach, a set of object emotional image quality based algorithms may be defined for identifying and learning the best photo image selection according to tracking information in each photo image.

In one approach, an Overall Emotional Image Quality Score (OEIQS) may be generated for each photo in a changed context (e.g., time sequence, moving objects, changing background, etc.). The OEIQS may include an estimated value of the one or more identified objects' emotion (e.g. using emotional analysis APIs, person identification, facial recognition, tone analysis, etc.). The OEIQS may be calculated according to a) image quality, b) object and photographer biometrics, and c) relationship between objects and the photographer (e.g., user initiating the capture of the image, owner of the image capture device, etc.), as described herein.

In one approach, the user may be the owner of the camera and also the one who typically takes the photographs (i.e. photographer). However, at times, the user may enlist the help of a random person nearby to use the camera to take a photograph of the user with the user's family, friends, scenery, etc., such that the user becomes an "object". Thus, in this case the photographer is a random person and likely irrelevant to the system.

In one approach, the photo images may be categorized according to the OEIQS, objects, context, etc. In one approach, an image quality list may be generated based on the similarities between the images (e.g., emphasized with each object's emotion, overall tone of the picture, scenery, etc.).

In one approach, the categorized and listed photo images may be selected and managed. In one approach, images that have an OEIQS above a predefined threshold may be moved to an Image folder. Alternatively, photo images that do not have an OEIQS above a defined threshold may be moved into a Temporary Folder of the storage. After a certain predefined duration of time, the images in the Temporary Folder of storage may be deleted from the device (e.g., camera, smart phone, computer memory, etc.).

In some approaches, a user may review the images in a Temporary Folder and restore a selected image for saving to the Image Folder. The OEA Service uses a learning process to use the metadata corresponding to the restored image to adjust OEA Service in terms of the configurations of emotional factors, image quality, etc. associated with the user preferences of the newly restored image.

Figure 4:
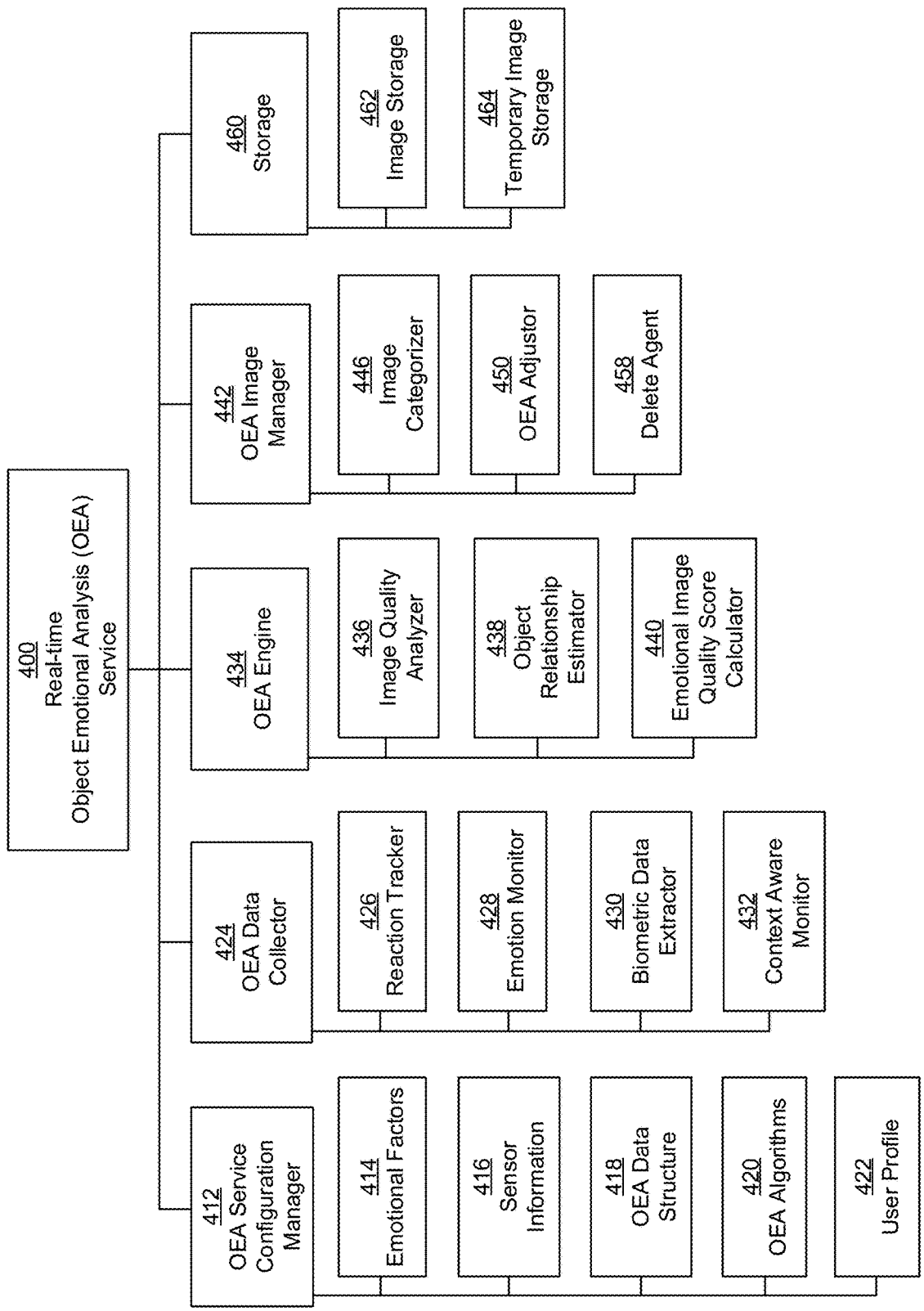
FIG. 4 is a flow chart of key components of Object Emotional Analysis (OEA) Service, according to one embodiment.

Now referring to FIG. 4, a schematic diagram depicts the key components of the Object Emotional Analysis (OEA) Service 400, according to one embodiment. In various approaches, the OEA Service 400 may be implemented on a camera, smart phone, computer memory, etc. The OEA Service 400 may be comprised of five key components: OEA Service Configuration Manager 412, OEA Data Collector 424, OEA Engine 434, OEA Image Manager 442, and Storage 460.

In one approach, the OEA Service Configuration Manager 412 may be a user interface for configuring a real time photo satisfaction analysis service. The OEA Configuration Manager 412 manages the configuration settings of the OEA Service 400. In one approach, the Configuration Manager 412 depicts the user preferences of the user (e.g., photographer), the objects to be photographed, the context of an event, etc. In one approach, a typical configuration may include setting Emotional Factors 414, setting Sensor Information 416, defining OEA Data Structure 418, configuring OEA algorithms 420, setting User Profile 422, etc.

In one approach, Emotional Factors 414 may be a set of predefined user emotional parameters for calculating Overall Emotional Image Quality Score (OEIQS) in each processed photo image. As input parameters, the following variables may be defined as emotional factors 414: object, image quality, histogram, favorite colors, time, geolocation, name of photographer, name of object, name of viewers, emotion types, emotion levels, resolution, sharpness, focused area, object position, gesture, etc.) For example, and not meant to be limiting in any way, happiness of both the photographer and the object(s) may be used as the most important factor thereby having the highest weight in the stratification calculation.

In one approach, the user may define priority of a set of Emotional Factors 414 corresponding to an image capture event. For example, for a Birthday Party, a user may configure the Emotional Factors 414 to set a higher weight of priority to the following input parameters: object, happiness of object, happiness of user (photographer), resolution, favorite colors, gestures, etc.

In one approach, the OEA Service Configuration Manager 412 may receive an adjusted Emotion Value corresponding to a restored image from a Temporary Folder. In response to receiving an adjusted Emotion Value, the OEA Service Configuration Manager 412 may in turn configure the Emotional Factors 414 corresponding to the user, objects, context, etc. with the adjusted Emotion Value corresponding to a restored image.

In one approach, Sensor Information 416 may include a file in plain text, a file extension for an Extensible Markup Language file format (XML), etc. for saving a set of sensor information. In one approach, a user may configure the OEA Service to monitor emotion OEA data of the user during the photography event. For example, and not meant to be limiting in any way, a body temperature sensor and heart rate sensor in a smart watch may be added for calculating the user's (e.g., photographer) emotion during the photography event.

In one approach, the OEA Data Structure 418 may be organized for defining photo image Emotional Factors 414, related data types, etc. For example, and not meant to be limiting in any way, OEA data may include Photo ID, Object List, OEIQS, Context List, Time List (capture time, delete, restore time, etc.), etc.).

In one approach, the OEA Service 400 includes defining cognitive OEA Data Structure 418 to track context of image capture event (e.g., photography context), object emotion, relationships between objects and photographer (e.g., viewer), and related OEA data.

In one approach, OEA Algorithms 420 may include a set of algorithms for determining and managing the best photo image according to the saved defined emotional factors in each photo image. For example, and not meant to be limiting in any way, according to defined Emotional Factors 414, the algorithm may include:

a) Emotional enhanced image similarity algorithm for determining if two images are similar at a certain level (e.g., image contents, histogram, color, objects, time, geolocation, embedded object emotion types and levels, etc.);

b) Emotional enhanced image quality comparison algorithm for comparing two similar images at a certain level (e.g., emotion level, resolution, sharpness, focused area, object position and gesture, etc.)

c) Emotional enhanced deleting algorithm for deleting any old images saved in a temporary folder for more than a defined time duration (e.g., 10 days).

In one approach the OEA Service 400 includes defining a set of object emotional quality-based algorithms for identifying and learning the best photo image selections corresponding to the tracking information of each image.

In one approach, a User Profile 422 includes a file, database, etc. for saving personal characteristic information and other configuration settings for customizing OEA Service 400. For example, and not meant to be limiting in any way, OEA data of object's age, gender, education level, and relationship to photographer can be used to weight the Emotional Factors 414.

In one approach, the component OEA Data Collector 424 is a module on a client device (e.g., camera, smart phone, computer, etc.) for collecting useful OEA data from the user (e.g., photographer) and objects (i.e., objects depicted on the image at real time). In one approach, OEA data may be collected including objects, photographer, and photo viewers from devices (e.g., camera, Internet of Things (IoT) devices, wearable devices, etc.). Collecting OEA data may include extracting any available data provided by biometric parameters of the object (e.g., person depicted in the image) during the photographing process and saving the OEA data as metadata of the captured photo image. Collecting OEA data may also include monitoring real time photographer emotion during the photography event (e.g., the OEA data may be collected from wearable devices), and updating the OEA data into the metadata of the captured photo image.

In one approach, that Data Collector 424 may collect the OEA data and then the collected OEA data is added by the Data Collector 424 into the originally created metadata during image creation (e.g., image capture, photographing, etc.). In one approach, the Data Collector 424, may combine all the collected OEA data into the metadata associated with the captured image.

The OEA Data Collector 424 may utilize a Reaction Tracker 426, an Emotion Monitor 428, a Biometric Data Extractor 430, a Context Aware Monitor 432, etc. The foregoing list of data sources is not exhaustive and may include other sources for data collection not identified herein.

The Reaction Tracker 426 is a module for monitoring dynamic changes in the image. For example, the Reaction Tracker 426 may monitor dynamic changes of a series of images according to at least one of the following: emotion data, biometric data, context data, etc.

For instance, objects of an image may not smile at the same time: some smile when the photographer gave instruction "say cheese" (Time 1) and some smile after the photographer's instruction (Time 2). The delta of the output of Biometric Data Extractor 430 and Context Aware Monitor 432 between Time 1 and Time 2 may be tracked by Reaction Tracker 426. In one approach, the deltas between Time 1 and Time 2 on the same object, and the delta between object1 and object2 may be useful for determining the better reaction for inputting into Emotional Image Quality Score Calculator 440.

In one approach, an Emotion Monitor 428 may be a module for monitoring emotional information of the photographer, object emotion during the related image process, etc. The Emotion Monitor 428 may update the collected emotional information into the metadata of the captured photo image.

In one approach, the Biometric Data Extractor 430 is a module for extracting available biometric parameters (e.g., heart rate, body temperature, facial expressions, voice, etc.) of the photographer and the object (i.e., person depicted on the image) during the photography event. The Biometric Data Extractor 430 may convert the extracted biometric parameters into like/dislike, emotion range, numerical range, etc. Then, the Biometric Data Extractor 430 may save the converted extracted biometric information as metadata of the captured photo image. For example, and not meant to be limiting in any way, data of heart rates and voice from both the photographer and object may be extracted and saved by the OEA Data Collector 424.

In one approach, the Context Aware Monitor 432 is a module for monitoring context changes and setting default emotion type. For example, and not meant to be limiting in any way, a default emotion type may be set as "Happiness" for a wedding, birthday party, etc. and, alternatively, "Sadness" may be set for funeral events. In one approach, a Context Aware Framework may be defined for managing duplicate images, e.g., images with similar objects, time, scenery, emotion, etc.

In one approach, the OEA Engine 434 is a module for providing an Emotional Image Quality Score service for a given photo image according to users and service defined service setting. The OEA Engine 434 may include an Image Quality Analyzer 436, an Object Relationship Estimator 438, an Emotional Image Quality Score Calculator 440, etc. The foregoing list is not exhaustive and may include other functions within the OEA Engine 434.

Figure 5:
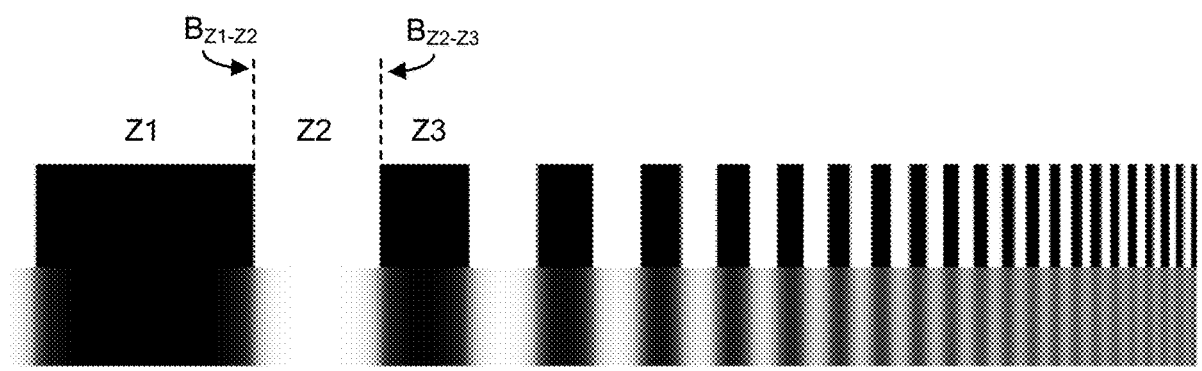
FIG. 5 is a schematic drawing of an assessment of the parameter of sharpness of an image, according to one approach.

In one approach, an Image Quality Analyzer 436 is a module for analyzing image quality (e.g., resolution, sharpness, focused area, smile level, etc.). Some existing physical factors based on image quality analysis and/or evaluation arts may be used. Parameters for analyzing image quality may include, but not limited to, the following: sharpness, noise, dynamic-range, color accuracy, distortion, uniformity, chromatic aberration, flare, color moiré, artifacts, compression, Dmax, etc. For example, as further illustrated in FIG. 5, and not meant to be limiting in any way, photo sharpness may be one of the most important image quality factors. Photo sharpness typically is defined by the boundaries $B_{Z1-Z2}$, $B_{Z2-Z3}$, between zones of different tones and colors, e.g., Zone 1 Z1 and Zone 3 Z3 are black and Zone 2 Z2 therebetween is white. The sharpness based quality evaluation art may be used.

In one approach, an Object Relationship Estimator 438 is a module for estimating relationships between photographer (e.g., camera device user, viewer, etc.) and objects of the image. For example, and not meant to be limiting in anyway, an Object Relationship Estimator 438 may include machine learning platforms (e.g., emotional analysis APIs) for person identification, tone analysis, etc. in a real-time implementation.

An Emotion E value for each object and photographer of the image may be estimated relative to the context of the image (birthday party, funeral, etc.) obtained from the Context Aware Monitor 432, the configuration of the Emotional Factors 414, the biometric data of the objects and photographer collected from the Biometric Data Extractor 430, etc. For example, the Emotion E values may be derived from data collected using emotional analysis APIs, person identification, facial recognition, tone analysis, etc.

The Emotional Image Quality Score Calculator 440 is a module for calculating Overall Emotional Image Quality Score according to a) image quality IQ value; b) emotion E value of the object: $E_1$, $E_2$, $E_3$, . . . $E_n$); and c) relationship value of object to the photographer (e.g., camera device user, viewer, etc.): $R_1$, $R_2$, $R_3$, . . . $R_n$).

The Overall Emotional Image Quality Score (OEIQS) may be defined in Equation 1 as:

$$OEIQS = IQ + \frac{\sum (R_i * E_i)}{N} \qquad \text{Equation 1}$$

In one approach, the OEA Image Manager 442 is a module for managing photo images. Tasks of the OEA Image Manager 442 may include a) tagging, moving, etc. images that do not meet a user-defined threshold to a Temporary Image Storage 464; b) learning user-implemented operations to restore images from Temporary Image Storage 464; c) deleting images in the Temporary Image Storage 464, etc. Components of the OEA Image Manager 442 may include an Image Categorizer 446, an OEA Adjustor 450, a Delete Agent 458, etc. The foregoing list is not exhaustive, and other components not described herein may be included as components of the OEA Image Manager 442.

In one approach, an Image Categorizer 446 is a module for categorizing photo images according to the received OEIQS from the Emotional Image Quality Score Calculator 440 of the OEA Engine 434. In one approach the Image Categorizer 446 may generate an image quality list based on the similarities of the photos. For example, and not meant to be limiting in any way, comparing similarities between photos may include emphasis of each object's emotion, overall tone of the image, scenery, etc.

In one approach, an OEA Adjustor 450 is a module for adjusting and updating the Emotional Factors 414 if a user restores an image from the Temporary Image Folder 464 within the storage 460 to the default Image Storage 462. The OEA Adjustor 450 adjusts, revises, etc. the Emotional Factors 414 of the OEA Service Configuration Manager 412 to reflect the OEA data obtained from the restored image.

In one approach, the Delete Agent 458 is a module for deleting images from the Temporary Image Storage 464. In some approaches, the Delete Agent 458 may provide a time duration to hold images stored in the Temporary Image Storage 464, and then when the images have been stored for the defined time duration, the Delete Agent 458 initiates deletion of the images from the device (e.g., camera, smart phone, computer memory, etc.).

In one approach, the Storage 460 on the device includes a folder for Image Storage 462 for images the meet the optimal parameters of the OEA service 400. In one approach, the Image Storage 462 provides storage of the "best" images. In one approach, the Image Storage 462 folder is a default folder where all photos are stored after captures, and the OEA service 400 is a process to remove images from the Image Storage 462 folder to the Temporary Image Storage 464 folder.

In another approach, following capture of an image, the OEA service 400 processes the image and provides a recommendation for storage of the image to the user 602 to indicate deposition of the image into a storage folder. For example, and not meant to be limiting in any way, The OEA service 400 may process the image and the OEA Image Manager 442 categorizes the image as not meeting a user-defined threshold for saving the image, thereby a decision request is provided to the user 602 (e.g., by dialog box) to confirm moving the image to the Temporary Image Storage 464. Alternatively, if the image does meet the user-defined threshold for saving an image, a decision request may be provided to the user 602 to confirm moving the image to the Image Storage 462. In some approaches, if the Image Storage 462 is a default move, then the user 602 may only receive a decision request if the image does not meet the user-defined threshold thereby requesting a decision to move the image to the Temporary Image Storage 464.

Figure 6:
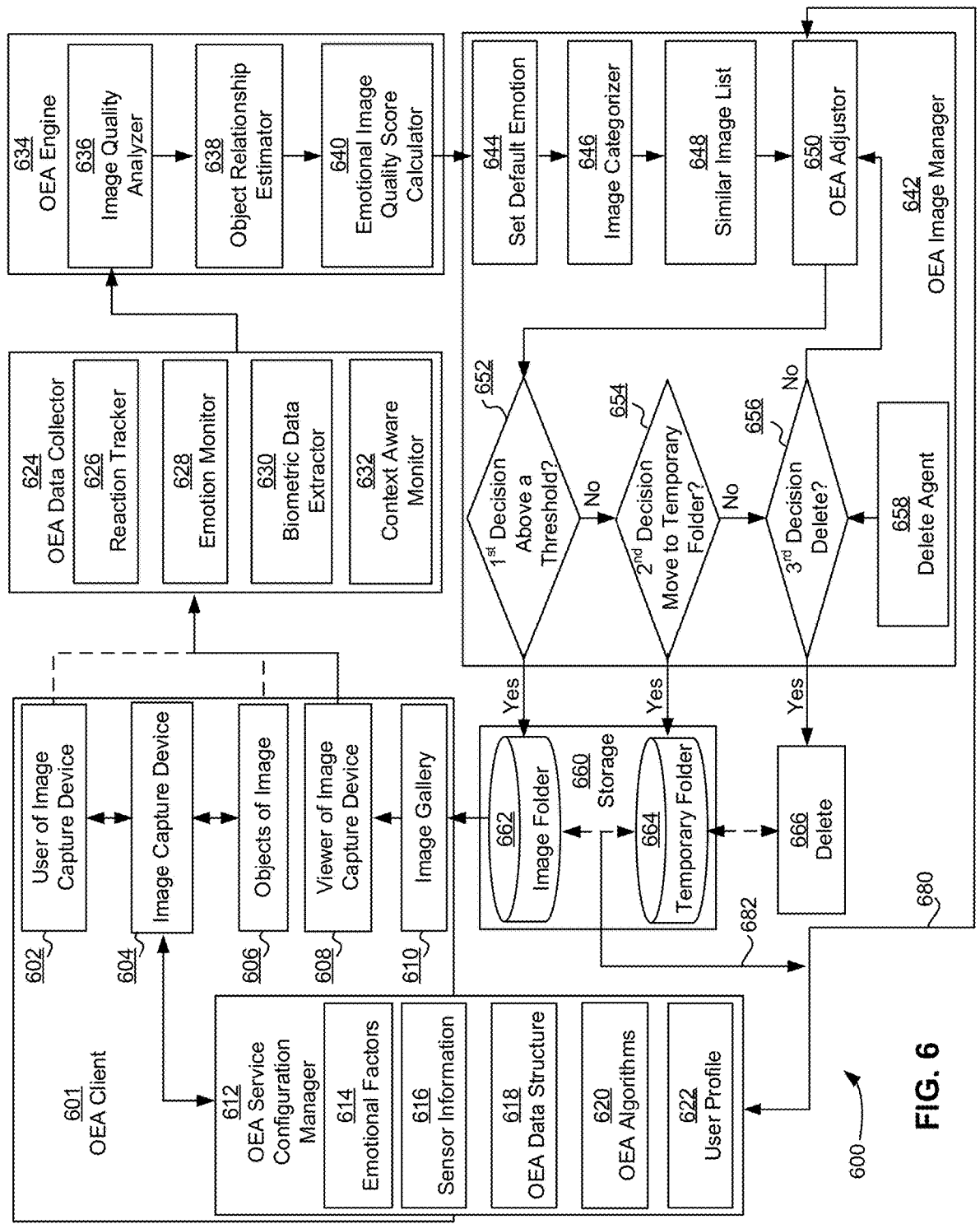
FIG. 6 is a detailed flowchart of the Object Emotional Analysis (OEA) Service, according to one embodiment.

Referring now to FIG. 6, a schematic diagram is shown of a flowchart of the key components of the OEA Service 600 implemented for real-time satisfaction, according to one embodiment. For the purposes of this disclosure, "real-time" is defined as processing captured images as they are being captured.

In one approach, an OEA client 601 may include an image capture device 604, the user 602 of the image capture device 604, the objects 606 of the image (persons in the image, animals, structures, etc.). Each of these components may interact, influence, affect, etc. each other. The OEA client 601 may include the OEA Service Configuration Manager 612 that comprises the Emotional Factors 614, Sensor Information 616, OEA Data Structure 618, OEA Algorithms 620, and User Profile 622. As described herein, the OEA Service Configuration Manager 612 manages each of these components relative to the user 602, objects 606, and image capture device 604. The configurations managed by the OEA Service Configuration Manager 612 may be input into the Image Capture Device 604 to associate the configurations with each captured image.

In one approach, a configuration of the User Profile 622 may include an indication of whether the Emotion Monitor 628 of the OEA Data Collector 624 will track and collect emotion data of the user 602 (photographer, owner of the camera, etc.) during the photography event. The configuration may be adjusted directly by the user 602, indirectly by a detection of a wearable device, detected later during a display on the Viewer 608 of a captured image from the Image Gallery 610, etc. For example, the OEA Service Configuration Manager 612 may detect a wearable device on the user 602, and upon detection, change the configuration of the User Profile 622 to indicate the user 602 will be monitored by the Emotion Monitor 628, or alternatively, if no wearable device is detected, then the OEA Service Configuration Manager 612 maintains a default configuration indicating the Emotion Monitor 628 does not collect data from the user 602.

The viewer 608 is the hardware portion of the image capture device 604 that frames the image for capture. In one approach, the scene framed in the viewer 608 of the image capture device 604 becomes the image framed for capture. In one approach, the viewer 608 may not frame of a scene according to the relationship and/or emotional factors of the user and objects of the image. The OEA client 601 includes an image gallery 610 that includes captured images.

In one approach, the viewer 608 may be a viewing screen of the image capture device. For example, but not meant to be limiting in any way, the viewer may be one of the following: a viewing screen of a camera, a display screen of mobile phone, an e-photo frame that wirelessly connects to the photo storage, etc.

In one approach, the OEA Service 600 may monitor a user's response to images from the Image Gallery 610 that are shown on the viewer 608. For example, as an image from the Image Gallery 610 is viewed by a user 602 on the display screen of a mobile phone, the OEA Data Collector 624 may detect changed data from the image, e.g., the user's signals of emotion, biometrics, contexts of the image, etc. The OEA Data Collector 624 may track the data associated with the image being viewed on the Viewer 608, and adjust the data accordingly. In some cases, the data changes processed during this viewing may be used to move unwanted images from the Image Folder 662 to the Temporary Folder 664.

In one approach, the OEA Data Collector 624 collects data from viewer 608 of the image capture device 604, the user 602 (dashed arrow) and the objects 606 of the image (dashed arrow) at the time of image capture. The OEA Data Collector 624 may collect data for a series of sources, for example, a Reaction Tracker 626, an Emotion Monitor 628, a Biometric Data Extractor 630, a Context Aware Monitor 632, etc. as described in the OEA Service 400 of FIG. 4.

In one approach, the OEA Engine 634 receives the collected OEA data from the OEA Data Collector 624 for a captured image. The OEA Engine 634 processes the image information provided by the image capture device of the captured image to analyze the image quality (by the Image Quality Analyzer 636), estimate the object relationship to the photographer (by the Object Relationship Estimator 638), and with this information calculates the Overall Emotional Image Quality Score (OEIQS) (by the Emotional Image Quality Score Calculator 640) as described in OEA Service 400 of FIG. 4.

In one approach, as shown in FIG. 6, the OEA Image Manager 642 receives the OEIQS for the captured image from the OEA Engine 634, and using the information provided determines the storage of the captured image. In one approach, the OEA Image Manager 642 may Set Default Emotion 644. For example, if the photographing event is a funeral, the Set Default Emotion 644 may be set as "sad," and alternatively, if the photographing event is a birthday party, the Set Default Emotion 644 may be set as "happy." In other approaches, additional default parameters may be set by the OEA Image Manager 642.

In one approach, the OEA Image manager 642 may implement the Image Categorizer 646 to categorize the captured image with similar images with a similar OEIQS within the parameter of default emotion as set by the Set Default Emotion 644.

In one approach, within the category as determined by the Image Categorizer 646 the OEA Image Manager 642 may form a Similar Image List 648 of similar images (e.g., duplicate images) in a category in order to identify key preferred characteristics, parameters, etc. of the images of a similar event. The images of the Similar Image List 648 having a higher OEIQS will more closely meet the emotional, relationship, context, etc. expectations of the photographer than images of the Similar Image List 648 that have lower OEIQSs.

The OEA Image Manager 642 will implement the OEA Adjustor 650 to send the preferred characteristics, parameters, etc. of the images higher on the Similar Image List 648 to the OEA Service Configuration Manager 612 to adjust Emotional Factor 614, OEA Data Structure 618, OEA Data Algorithms 620, etc. according to the newly acquired preferred characteristics, parameters, etc. of the Similar Image List 648.

In one approach, the OEA Image Manager 642 may have a set threshold OEIQS to determine the storage of the image. In one approach, the threshold OEIQS may be set by the user 602 (e.g., photographer, image processor, etc.). In another approach, the threshold OEIQS may be set by the OEA Image Manager 642 according to the Similar Image List 648. In one approach, the threshold score may correspond to the OEIQS of a set of duplicate images, e.g., a lower OEIQS, an average OEIQS, etc.

In one approach, the OEA Image Manager 642 makes a first decision 652 whether the OEIQS of the image is above a threshold OEIQS. If the OEIQS of an image is above a threshold, then the image may be stored in the Image Folder 662 of Storage 660. In one approach, the Image folder 662 may be the original folder, the default folder, etc. In one approach, the Storage 660 region may be located on a device (camera, smartphone, computer, etc.). In one approach, the Storage 660 may be located externally to the device, (e.g., cloud, server, external hard drive, etc.). The user 602 may configure the OEA Image Manager 642 to identify a preferred location of the Storage 660. The preferred location of the storage 660 may be combination of locations (e.g., camera and cloud, camera, computer, and cloud, etc.).

In one approach, images may be moved from the Image folder 662 to the Temporary Folder 664. In one approach, images may be moved from the Temporary Folder 664 to the Image Folder 662 in response to the image being restored.

In one approach, if an image has an OEIQS below the threshold, then the image may involve a second decision 654 of whether to move the image to a Temporary Folder 664 in the Storage 660. If the decision is Yes, as determined by a configuration by the user 602, a dialog box to the user 602, a default configuration set by the OEA Image Manager 642, etc. then the image is stored in a Temporary Folder 664 in the Storage 660.

In one approach, an image in the Temporary Folder 664 may remain in the temporary storage for a designated period (e.g., 10 days, 2 weeks, 30 days, etc.). At the end of the designated period of time, the image will be deleted from the Storage 660.

Referring back to the second Decision 654, if the second decision is not to move the image to the Temporary Folder 664, a third Decision 656 may be implemented to determine whether the image should be deleted immediately.

In one approach, the third Decision 656 of whether to delete an image may be managed by the Delete Agent 658 of the OEA Image Manager 642. In one approach, the Delete Agent 658 may be configured by the user 602, the OEA Image Manager 642, etc. to delete images having an OEIQS below a threshold. In one approach, the Delete threshold score may be different from the threshold score of the first Decision 652.

In one approach, at the third Decision 656, the user 602 may receive a notification of the request to delete. In such an approach, the user 602 may be able to make the third Decision 656. If the user 602 decides "Yes," then the image will be deleted as indicated by Delete 666.

In one approach, if the user 602 decides "No", then the OEA Image Manager 642 can restore the image information to the OEA Adjustor 650 where the image information provides new preferred characteristics, parameters, etc. of the restored image to be sent to the OEA Service Configuration Manager 612 (bidirectional arrow 680). In one approach, the OEA Service Configuration Manager 612 may send changed configurations to the OEA Adjustor 650 (bidirectional arrow 680).

In addition, in one approach, the OEA Adjustor 650 may adjust the OEIQS of the restored image to above the threshold score, thereby allowing the restored image to be stored in the Image Folder 662 (receiving a "Yes" to first Decision 652). In another approach, the OEA Adjustor 650 may adjust the threshold to a lower score in order to save images having a similar OEIQS to the restored image.

In one approach, user 602 may restore an image from the Temporary folder 664 to the Image Folder 662 (e.g., original folder, default folder, etc.) at any time, and the OEA data of the restored image may be sent (as shown in arrow 682 to bidirectional arrow 680) to the OEA Service Configuration Manager 612 and the OEA Adjustor 650.

Figure 7A:
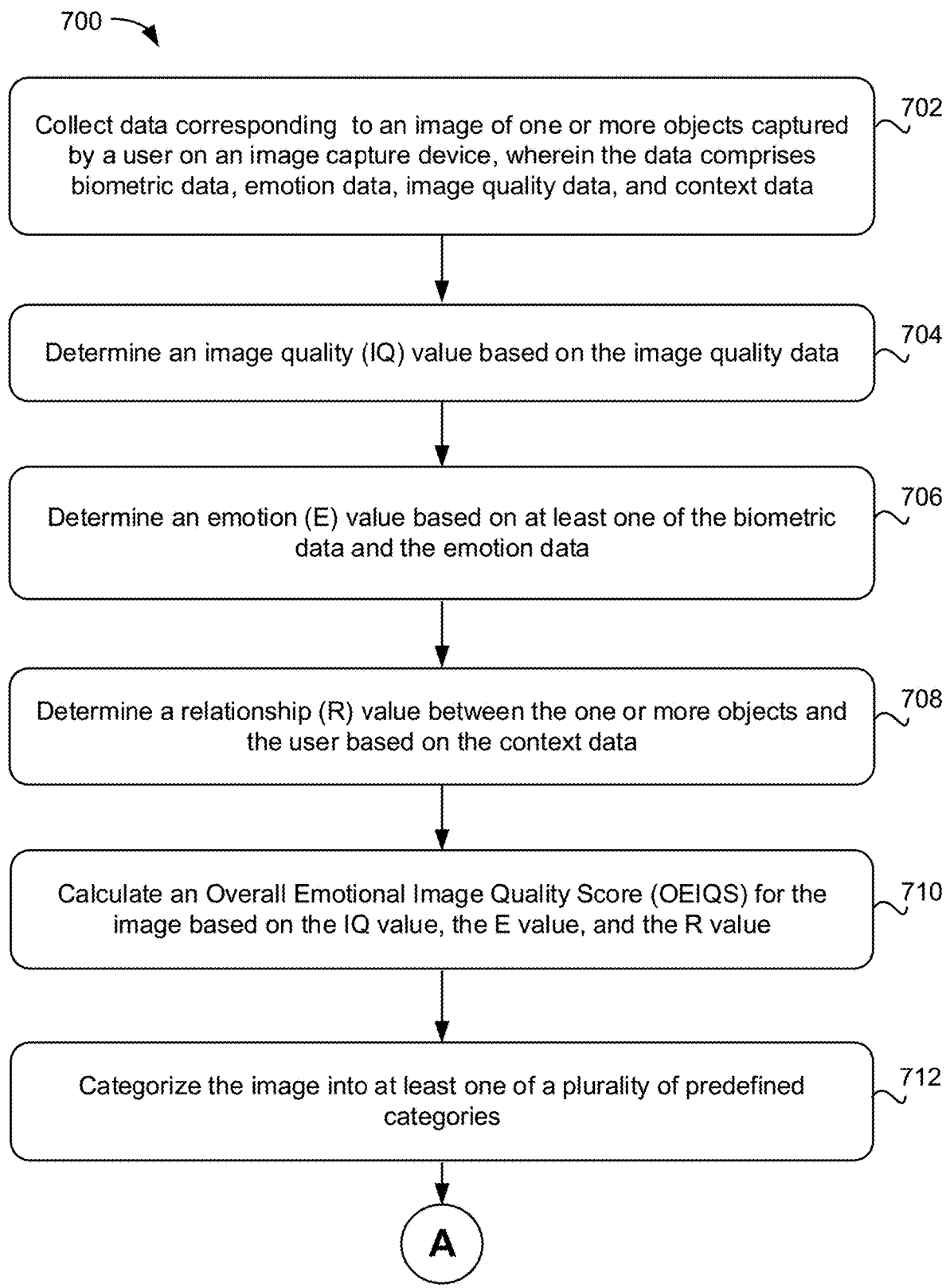
FIG. 7A is a flow chart of a method of a client use the Object Emotional Analysis (OEA) Service, according to one embodiment.
Figure 7B:
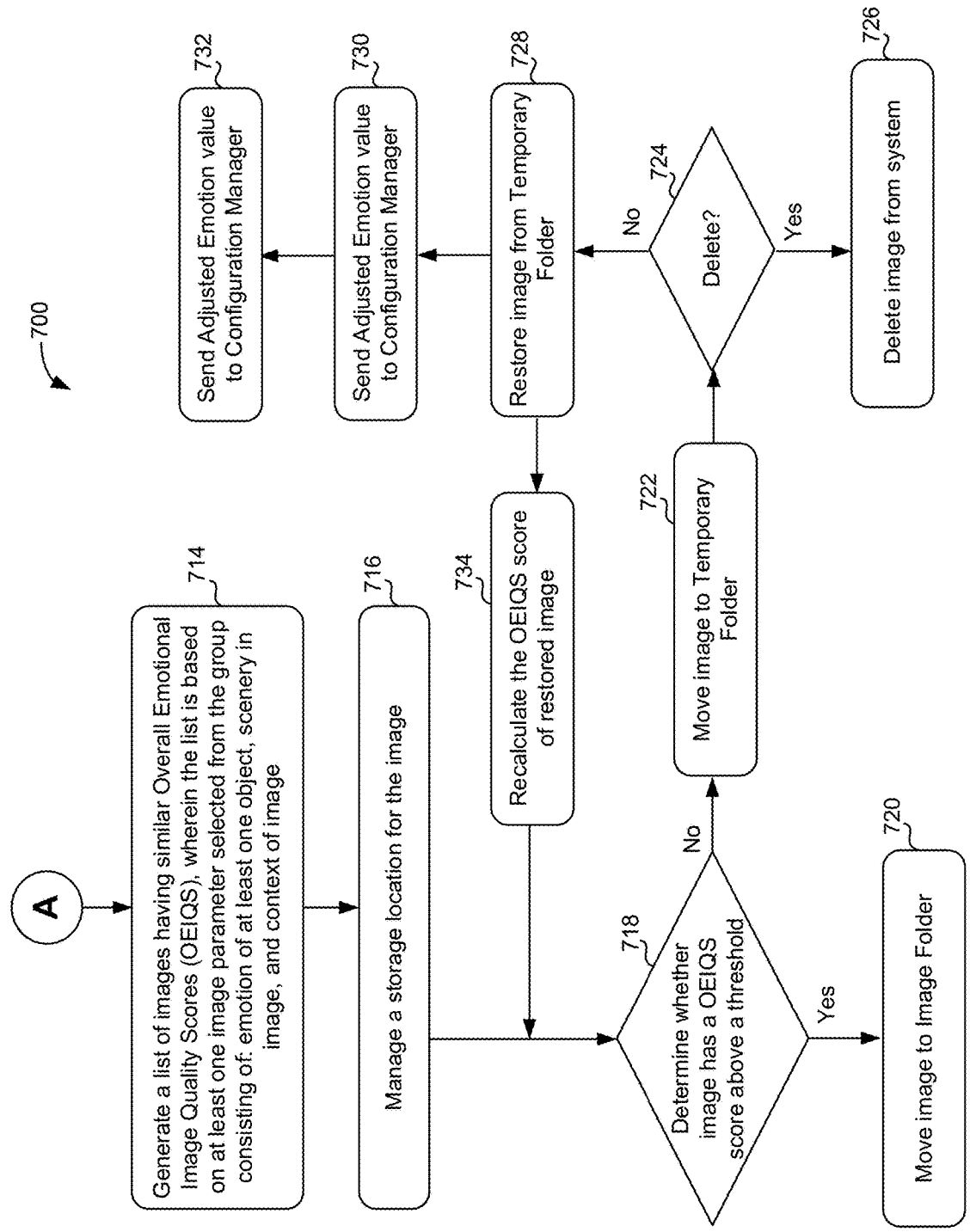
FIG. 7B is a flow chart of continued steps of method of a client use of Object Emotional Analysis (OEA) Service, according to one embodiment.

Now referring to FIGS. 7A-7B, a flowchart of a client based computer-implemented method 700 of cognitive Object Emotional Analysis (OEA) of captured images based on a best image determination, is shown according to one embodiment. The method 700 may be performed in accordance with the present invention in any of the environments depicted in FIGS. 1-9, among others, in various embodiments. Of course, more or fewer operations than those specifically described in FIGS. 7A-7B may be included in method 700, as would be understood by one of ordinary skill in the art upon reading the present descriptions.

Each of the steps of the method 700 may be performed by any suitable component of the operating environment. For example, in various embodiments, the method 700 may be partially or entirely performed by image capture device, smart phone, tablet, computer, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

FIGS. 7A-7B describe the operations included in a method 700 of using a cognitive OEA Service 400. The Key Components of the OEA Service 400 described in FIG. 4 and the detailed flowchart of the OEA Service 600 described in FIG. 6 illustrate the components and associated aspects of each of the operations of method 700. In one approach, method 700 may be performed as the image is being captured, for example, the cognitive Object Emotional Analysis (OEA) processes each image in real time. As each image is captured, the operations of method 700 are performed such that each image may be automatically stored according to the cognitive OEA service described herein.

In one approach, as described in method 700, each component of the OEA Service 600 as described in FIG. 6 may be client-based such that method 700 is implemented on a client device.

As shown in FIG. 7A, method 700 may initiate with operation 702, wherein a computer-implemented method includes collecting data corresponding to an image of one or more objects captured by a user on an image capture device, where the data may include biometric data, emotion data, image quality data, and context data.

In one approach, the biometric data may correspond to at least one object of the image and may be saved as metadata associated with the image. Looking back to the key components of the OEA Service in FIG. 4, the Biometric Data Extractor 430 may extract available biometric parameters of the photographer and the at least one object of the image being captured. In one approach, the biometric data may be extracted from the photographer and the objects of the image while the image is being captured, (e.g., photographer and at least one of the objects has a wearable device, and/or the expressions of the objects are processed by facial recognition, voice tone, etc.).

In one approach, the emotion data may correspond to the user of the image capture device during the image capture and may be saved as metadata associated with the image. Looking back to FIG. 4, the Emotion Monitor 428 may monitor the emotion of the photographer and at least one object of the image, and generate emotion data corresponding to the photographer and at least one object of the image.

In one approach, the image quality data may be received from the image capture device and may be saved as metadata associated with the image.

In one approach, the context data may be received from an Object Emotion Analysis (OEA) Service Configuration Manager 412, 612 and may be saved as metadata associated with the image.

The following operation of method 700 include evaluating the collected data corresponding to the captured image. The evaluating includes analyzing the collected data of the corresponding image to determine relative values that may be derived from a table of values.

Operation 704 includes determining an image quality (IQ) value based on the image quality data. In one approach, the image quality data may be analyzed to estimate an Image Quality (IQ) value corresponding to the captured image, where the IQ value may be an estimated value of an IQ parameter in a range of values. For example, and not meant to be limiting, an estimated IQ value for the corresponding captured image be a value in a range of greater than 0 and less than or equal to 10. In one approach, the IQ value may be derived from an Image Quality Index table.

Operation 706 includes determining an emotion (E) value based on at least one of the biometric data and the emotion data. In one approach, the E value may correspond to at least one object of the image. In one approach, the at least one object of the image may be limited to only the objects depicted in the image. In another approach, the objects of the image may include the objects depicted in the image and the user of the image capture device (e.g., the photographer). Each object depicted and identified in the corresponding captured image may have an estimated E value. The user (e.g., photographer) may have an estimated E value. Each estimated E value corresponding to a captured image may be a value in a range of defined values. For example, and not meant to be limiting, an estimated E value for each object may be a value in a range of greater than 0 and less than or equal to 10. In one approach, the E value may be derived from an Emotion Value Index table.

In one approach, estimating an emotion value corresponding to at least one object of the image may include processing an API designed for at least one parameter of the following: person identification, facial recognition, image tone analysis, a combination thereof, etc.

Operation 708 includes determining a relationship (R) value between the one or more objects and the user based on the context data. In one approach, the relationship (R) value may correspond to an association of each object of image to the user. Each object depicted and identified in the corresponding captured image will have a R value that reflects the degree of relationship of the object to the user (e.g., photographer). For each image, the number of R values may be equal to the number of objects in the image having a relationship with the photographer, (e.g., photographer's son, friends of photographer's son, etc.).

Each estimated R value corresponding to an identified object in the captured image may be a value in a range of defined values. For example, but not meant to be limiting, an estimated R value may be in a range of R values of greater than 0 to less than or equal to 10. In one approach, the R value for each object may be derived from a Relationship Value Index table.

Operation 710 of method 700 includes calculating an Overall Emotional Image Quality Score (OEIQS) for the image based on the IQ value, the E value, and the R value. In one approach, the Overall Emotional Image Quality Score OEIQS may include formula as depicted in Equation 1

$$OEIQS = IQ + \frac{\sum_{i=0}^{n}(R_i \cdot E_i)}{n} \qquad \text{Equation 1}$$

where n equals the number of objects. In one approach, n equals the number of objects in the image. In one approach, n equals the number of objects in the image plus an object being the user.

Operation 712 of method 700 includes categorizing the image into at least one of a plurality of predefined categories. In various approaches, the predefined categories may be based on at least one parameter of the following: the Overall Emotional Image Quality Score (OEIQS), at least one object depicted in the image, context of the image, a combination thereof, etc.

Looking to FIG. 7B, method 700 may include operation 714 of generating a list of images having similar Overall Emotional Image Quality Scores (OEIQS). In one approach, the list may include duplicate images of a time, objects, emotion, etc. In one approach, the list may be based on at least one parameter of the following: emotion of at least one object, scenery in image, context of image, a combination thereof, etc.

Operation 716 of method 700 includes managing a storage location for the captured image. Operation 716 may include a series of sub-operations for deciding whether an image is stored in an Image Folder 662, Temporary Folder 664, is deleted, or restored. In one approach, a sub-operation is a decision 718 that includes determining whether the image has an Overall Emotional Image Quality Score (OEIQS) above a threshold. As described herein, a threshold may be set by the user 602, the system, etc. In one approach, a threshold may correspond to OEIQS of duplicate images, e.g., an average OEIQS, a defined lower value of OEIQS, etc. For example, if an OEIQS is above an average of OEIQS of duplicate images, then the image has a score above a threshold.

In response to the decision 718, if the OEIQS is above a threshold ("Yes"), then a sub-operation 720 includes moving the image to an Image Folder 662 for storage. Storage of the Image Folder 662 may be on the device, on the computer, in the cloud, on the server, etc. (as shown on FIG. 6).

Alternatively, in response to the decision 718, if the OEIQS of the image is not above a threshold ("No"), then a sub-operation 722 includes moving the image to a Temporary Folder 664 for storage. In some approaches, storage of an image in the Temporary Folder 664 may be for a pre-defined duration of time (as shown on FIG. 6).

In one approach, the operation 716 of managing the storage location of an image includes a decision 724 of determining whether to delete an image from the Temporary Folder 664. If the response from the decision 724 is to delete the image from the Temporary Folder 664 ("Yes"), then a sub-operation 726 includes deleting the image from the system. In one approach, the image may be stored in the Temporary Folder 664 for a pre-defined duration of time. In one approach, a Delete Agent 458, 658 may define the predefined duration of time. In some approaches, the Delete Agent 458, 658 may be the user 602, OEA Image Manager 442, 642, OEA Service Configuration Manager 412, 612, etc. (as illustrated in FIGS. 4 and 6).

In another approach, if a response to the decision 724 is not to delete an image from the Temporary Folder 664 ("No"), then a sub-operation 728 includes restoring an image from the Temporary folder 664. In one approach, restoring an image from the Temporary Folder 664 may include selecting the image from the Temporary Folder 664, and adjusting the emotion (E) value corresponding to at least one object and the user associated with the restored image.

In one approach, restoring the image may include a sub-operation 730 of method 700 of sending the adjusted emotion (E) value corresponding to the at least one object and the user associated with the restored image to the OEA Service Configuration Manager 412, 612. Looking back to FIG. 6, the OEA Image Manager 642 may adjust the emotion (E) value corresponding to the restored image via the OEA Adjustor 650 and send the adjusted emotion (E) value to the OEA Service Configuration Manager 612 which in turn updates the configuration of Emotional Factors 614 of the OEA System 600.

Returning to FIG. 7B, in one approach, a sub-operation 732 includes updating the configuration of the Emotional Factors 414, 614 of the OEA Service Configuration based on each of the adjusted emotion (E) values corresponding to the restored image. In some approaches, the process of updating the OEA Service Configuration Manager 412, 612 is a learning process.

Sub-operation 734 includes recalculating the Overall Emotional Image Quality Score (OEIQS) associated with the restored image, where the recalculation includes the each adjusted emotion (E) value associated with the restored image.

Operation 718 then determines from the recalculated OEIQS of the restored image whether the image has an OEIQS above a threshold. In one approach, the recalculated OEIQS may be the new threshold for determining if an image is stored in the Image Folder. In one approach, a sub-operation 720 includes moving the restored image in the Image folder according to the recalculated OEIQS of the restored image.

Figure 8:
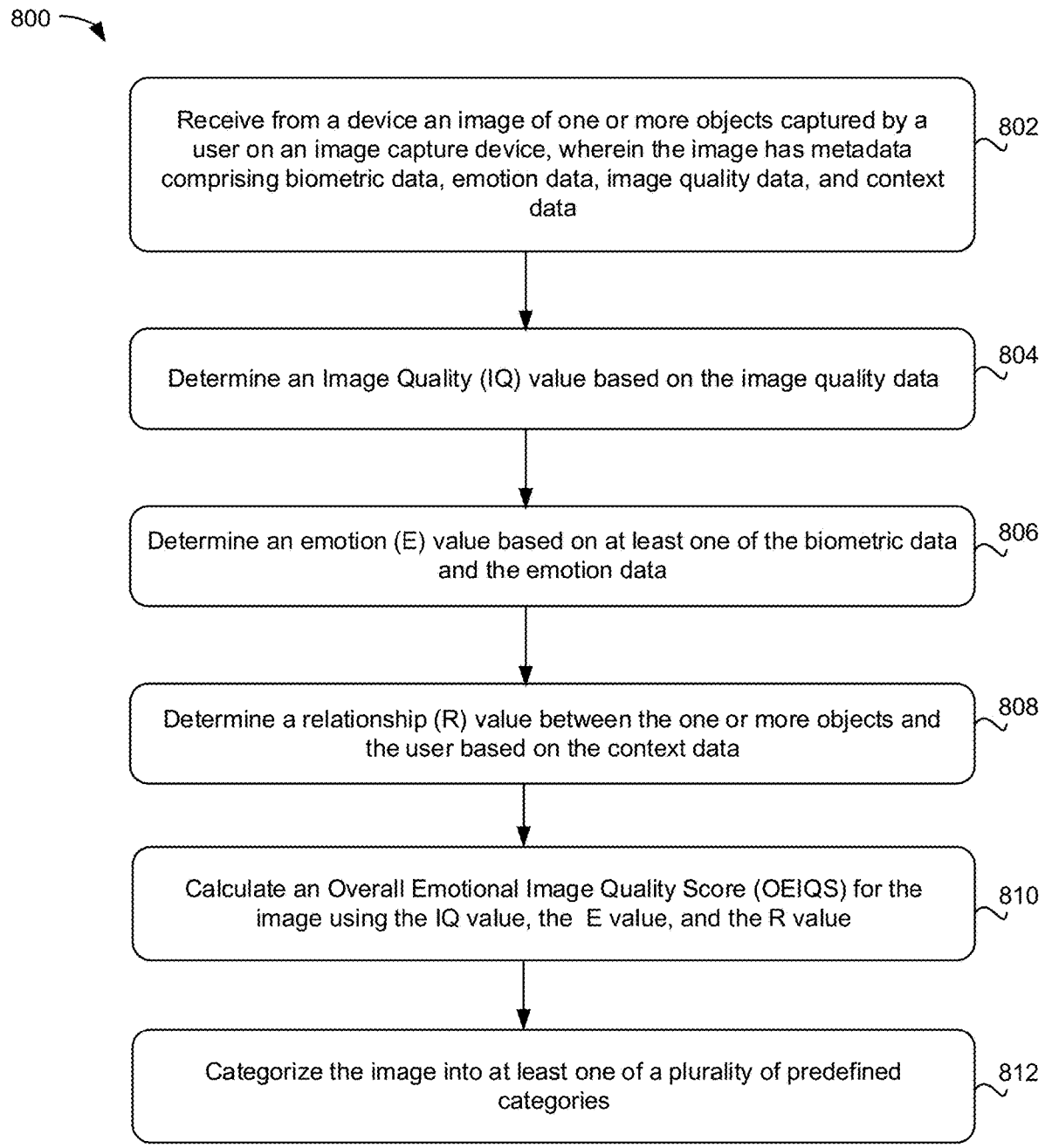
FIG. 8 is a flow chart of method of a server use of Object Emotional Analysis (OEA) Service, according to one embodiment.

Now referring to FIG. 8, a flowchart of a server-based computer-implemented method 800 of cognitive Object Emotional Analysis (OEA) of images based on a best image determination, is shown according to one embodiment. The method 800 may be performed in accordance with the present invention in any of the environments depicted in FIGS. 1-9, among others, in various embodiments. Of course, more or fewer operations than those specifically described in FIG. 8 may be included in method 800, as would be understood by one of ordinary skill in the art upon reading the present descriptions.

Each of the steps of the method 800 may be performed by any suitable component of the operating environment. For example, in various embodiments, the method 800 may be partially or entirely performed by image capture device, smart phone, tablet, computer, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, a computer-implemented method 800 may initiate with operation 802 that includes receiving an image from a device. The server, cloud, etc. may receive a plurality of images from the device. The method 800 may include a server, cloud, etc. receiving a plurality of images from a plurality of devices. In one approach, server, cloud, etc. may receive the plurality of images at different times, e.g., a set of images may be received on one day, another set of images may be received a week later, etc.

In one approach, operation 802 includes receiving from a device an image of one or more objects captured by a user on an image capture device, where the image has metadata that may include biometric data, emotion data, image quality data, and context data. In one approach, each image has associated metadata that includes biometric data corresponding to at least one object of the image, emotion data corresponding to a user of an image capture device during the image capture, image quality data from the image capture device, and context data corresponding to the image.

Operation 804 includes determining an Image Quality (IQ) value based on the image quality data.

Operation 806 includes determining an emotion (E) value based on at least one of the biometric data and the emotion data. In one approach, an emotion (E) value corresponds to the at least one object of the image.

Operation 808 includes determining a relationship (R) value between the one or more objects and the user based on the context data. In one approach, a relationship (R) value may correspond to an association of each object of the image to the user. In one approach, the objects of the image may include at least one object depicted in the image and the user of the image capture device (e.g., photographer). The processes of operation 804 may be as described herein for method 700 in FIGS. 7A-7B.

Operation 810 includes calculating an Overall Emotional Image Quality Score (OEIQS) for the image based on the IQ value, the E value, and the R value.

Operation 812 includes categorizing the image into at least one of a plurality of predefined categories. In one approach, the predefined categories are on the server, cloud, etc. In one approach, the categories are defined by the user, the OEA Service, etc.

Operations of method 800 that follow after operation 808 may be similar to operations starting at operation 714 of method 700 (see FIG. 7B).

Example of OEA Service

Figure 9:
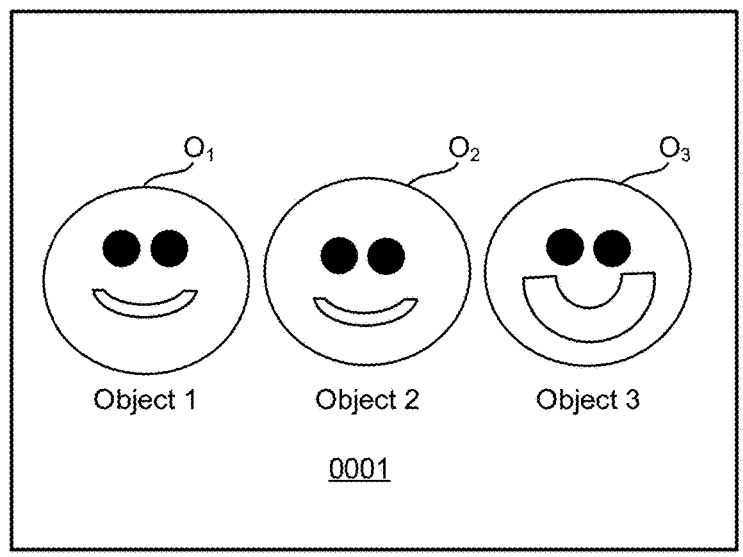
FIG. 9 is a schematic drawing of an example of the OEA Service, according to one embodiment.
Figure 9:
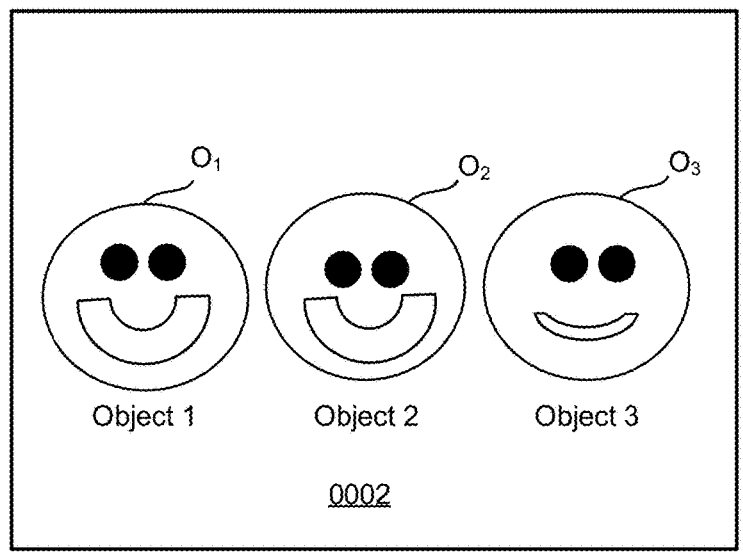

As shown in the schematic drawings of FIG. 9, two images 0001, 0002 include three objects known to a photographer. The images 0001, 0002 were captured by a photographer at a Birthday Party for the photographer's son, Object 3 $O_3$. Object 1 $O_1$

TABLE 1

OEA Data Structure and Parameters

| Photo ID | Object List | OEIQS Score | Context List | TimeList |
|---|---|---|---|---|
| 0001 | 0001($O_1$, $O_2$, $O_3$) | 40.66667 | Birthday Party | Jul 4, 2018, . . . |
| 0002 | 0002($O_1$, $O_2$, $O_3$) | 37.33333 | Birthday Party | Jul 4, 2018, Jul 4, 2018, . . . | and Object 2 $O_2$ are friends of the photographer's son. The OEA Service Analysis 900 as described herein may analyze these two images 0001, 0002, and determine which may be kept and stored in an Image Folder (✓) and which may be stored in a Temporary Folder (X).

Table 1 (above) illustrates an OEA Data Structure and Parameters corresponding to the two images 0001, 0002. Photo ID (0001, 0002) in the first column may be an identifier of the image provided by the image capture device. The images include three Objects identified by the user, $O_1$, $O_2$, and $O_3$. The OEA Data Structure may also include the OEIQS of each image, the context of the image (Birthday Party), and the TimeList that includes when the image was captured, when stored, when restored, etc.

Table 2 (below) lists the calculation of the Overall Emotional Image Quality Score (OEIQS) for each image. Each object has a unique data row since each object of the image has a unique Emotion value and a unique Relationship value. The Image Quality values in the IQ column may be similar for all objects of an image. In some cases, a single image may have different parameters of Image Quality, for example, the

TABLE 2

Overall Emotional Image Quality Score (OEIQS)

| Photo ID | Object ID | Object Name | Physical Image Quality IQ 1-10 | Relationship with Photographer $R_i$ 1-10 | Emotion Type Happy Index $E_i$ 1-10 | Individual Object Score | OEIQS |
|---|---|---|---|---|---|---|---|
| 0001 | $O_1$ | X | 10 | 2 | 3 | 16 | |
| 0001 | $O_2$ | Y | 10 | 2 | 3 | 16 | |
| 0001 | $O_3$ | Z | 10 | 10 | 8 | 90 | 40.66667 |
| 0002 | $O_1$ | X | 10 | 2 | 8 | 26 | |
| 0002 | $O_2$ | Y | 10 | 2 | 8 | 26 | |
| 0002 | $O_3$ | Z | 10 | 10 | 5 | 60 | 37.33333 | image quality of one object may be different compared to another object in the same image (e.g., one object is in focus at the front, a second object is out of focus, etc.).

In Table 2, and referring to FIG. 9, the IQ values are the same for both images 0001, 0002, and so each object received the estimated IQ value of "10." Looking at the Relationship with the Photographer ($R_i$) column, the values correspond to the Photographer (e.g., user) configuration. $O_3$ is the photographer's son, so the value is highest, "10" whereas the friends of the son $O_1$ and $O_2$ receive lower values of "2." Looking to the Emotion Type ($E_i$) column, the values reflect the emotion relative to each object of each image. As shown on the drawing of FIG. 9, image 0001 shows the photographer's son $O_3$ having a very happy face, so the emotion value is relatively high "8," but in image 0002, the photographer's son has a less happy face, having a "5," and the other two $O_1$, $O_2$ have very happy faces, each having a "8" value. Each Object $O_1$, $O_2$, and $O_3$ received an Individual Object Score that reflects the values of IQ, $R_i$, and $E_i$ for each object.

To compare each image, an Overall Emotional Image Quality Score is calculated that includes all the values of the objects in the image. As shown the OEIQS for each image 0001 and 0002 are in the OEIQS column. Thus, the OEA Service may use the following logic algorithm to determine where to move the image:

If (OEIQS(Photo-0001) >= OEIQS(Photo-0002)),
    then
        remove (Photo-0002)

-continued else
        remove (Photo-0001)

For the example shown in FIG. 9 and Tables 1 and 2, although both Image 0001 and image 0002 have similar content (son and two friends), at the same event (Birthday Party) and all are happy, the OEA Service determines that image 0001 is a better image than Image 0002. Thus, image 0002 will be removed to the Temporary Folder (X), and image 0001 will be stored in the Image Folder (✓).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method,
comprising: collecting data corresponding to an image of one or more objects captured by a
user on an image capture device, wherein the data comprises biometric data, emotion data, image quality data, and context data;
determining an image quality (IQ) value based on the image quality data;
determining an emotion (E) value based on at least one of the biometric data and
the emotion data;
determining a relationship (R) value between the one or more objects and the user based on the context data;
calculating an Overall Emotional Image Quality Score (OEIQS) for the image based on the IQ value, the E value, and the R value;
categorizing the image into at least one of a plurality of predefined categories; and
managing a storage location for the image, wherein the managing
comprises: determining whether the image has an Overall Emotional Image Quality
Score (OEIQS) above a threshold,
in response to determining that the OEIQS of the image is above the threshold: moving the image to an Image Folder, and
in response to determining that the OEIQS is below the threshold: storing the image in a Temporary Folder, restoring the image from the Temporary Folder, and deleting the image from the Temporary Folder.

2. A computer-implemented method as recited in claim 1, wherein the biometric data corresponds to at least one object of the image and is saved as metadata associated with the image.

3. A computer-implemented method as recited in claim 1, wherein the emotion data corresponds to the user of the image capture device during the image capture and is saved as metadata associated with the image.

4. A computer-implemented method as recited in claim 1, wherein the image quality data is received from the image capture device and is saved as metadata associated with the image.

5. A computer-implemented method as recited in claim 1, wherein the context data is received from an Object Emotion Analysis (OEA) Service Configuration Manager and is saved as metadata associated with the image.

6. A computer-implemented method as recited in claim 1, wherein the E value corresponds to at least one object of the image.

7. A computer-implemented method as recited in claim 1, comprising:
generating a list of images having similar Overall Emotional Image Quality Scores (OEIQS), wherein the list is based on at least one image parameter selected from the group consisting of: emotion of at least one object, scenery in image, and context of image.

8. A computer-implemented method as recited in claim 1, wherein restoring the image from the Temporary Folder comprises:
selecting the image from the Temporary Folder,
adjusting the emotion (E) value corresponding to at least one object and the user associated with the restored image,
sending the adjusted emotion (E) value corresponding to the at least one object and the user associated with the restored image to an OEA Service Configuration Manager,
updating a configuration of an Emotional Factor based on each of the adjusted emotion (E) values,
re-calculating the Overall Emotional Image Quality Score (OEIQS) associated with the restored image, wherein the recalculation includes each adjusted emotion (E) value, and
storing the restored image in the Image Folder according to the recalculated Overall Emotional Image Quality Score (OEIQS) of the restored image.

9. A computer-implemented method as recited in claim 1, comprising:
deleting the image from the Temporary Folder, wherein the image is stored in the Temporary folder for a pre-defined duration of time, wherein a Delete Agent defines the pre-defined duration of time.

10. A computer-implemented method as recited in claim 1, wherein determining the emotion value corresponding to at least one object of the image includes processing an API designed for at least one parameter selected from the group consisting of: person identification, facial recognition, and image tone analysis.

11. A computer-implemented method as recited in claim 1, wherein $$\text{the Overall Emotional Image Quality Score} = IQ + \frac{\sum_{i=0}^{n}(R_i \cdot E_i)}{n},$$

wherein n=a number of objects.

12. A computer-implemented method as recited in claim 1, wherein the predefined categories are based on at least one parameter selected from the group consisting of: the Overall Emotional Image Quality Score (OEIQS), at least one object depicted in the image, and context of the image.

13. A system,
comprising: a processor; and
logic integrated with the processor, executable by the processor, or integrated with and executable by the processor, the logic being configured to:
collect data corresponding to an image of one or more objects captured by a user on an image capture device, wherein the data comprises biometric data, emotion data, image quality data, and context data;
determine an image quality (IQ) value based on the image quality data;
determine an emotion (E) value based on at least one of the biometric data and
the emotion data;
determine a relationship (R) value between the one or more objects and the user based on the context data;
calculate an Overall Emotional Image Quality Score (OEIQS) for the image based on the IQ value, the E value, and the R value;
categorize the image into at least one of a plurality of predefined categories;
and manage a storage location for the image by:
determining whether the image has an Overall Emotional Image Quality Score (OEIQS) above a threshold,
in response to determining that the OEIQS of the image is above the threshold: moving the image to an Image Folder, and in response to determining that the OEIQS is below the threshold: storing the image in a Temporary Folder, restoring the image from the Temporary Folder, and deleting the image from the Temporary Folder.

14. A system as recited in claim 13, the logic further configured to generate a list of images having similar Overall Emotional Image Quality Scores (OEIQS), wherein the list is based on at least one image parameter selected from the group consisting of: emotion of at least one object, scenery in image, and context of image.

15. A system as recited in claim 13, wherein the logic configured to restore the image from the Temporary Folder comprises logic configured to:
   select the image from the Temporary Folder,
   adjust the emotion (E) value corresponding to each of at least one object and user associated with the restored image,
   send the adjusted emotion (E) value associated with the restored image to an OEA Service Configuration Manager,
   update an Emotion Factor configuration based on the adjusted emotion (E) value,
   re-calculate the Overall Emotional Image Quality Score (OEIQS) associated with the restored image, and
   store the restored image in the Image Folder according to the recalculated Overall Emotional Image Quality Score (OEIQS) of the restored image.

16. A computer-implemented method,
comprising: receiving from a device an image of one or more objects captured by a user on
   an image capture device, wherein the image has metadata comprising biometric data, emotion data, image quality data, and context data;
   determining an Image Quality (IQ) value based on the image quality data;
   determining an emotion (E) value based on at least one of
      the biometric data and
      the emotion data;
   determining a relationship (R) value between the one or more objects and the user based on the context data;
   calculating an Overall Emotional Image Quality Score (OEIQS) for the image using the IQ value, the E value, and the R value;
   categorizing the image into at least one of a plurality of predefined categories; and
   managing a storage location for the image, wherein the managing
      comprises: determining whether the image has an Overall Emotional Image Quality
         Score (OEIQS) above a threshold,
      in response to determining that the OEIQS of the image is above the threshold: moving the image to an Image Folder,
      in response to determining that the OEIQS is below the threshold: storing the image in a Temporary Folder, restoring the image from the Temporary Folder, and deleting the image from the Temporary Folder.

17. A computer-implemented method as recited in claim 16, comprising:
   generating a list of images having similar Overall Emotional Image Quality Scores (OEIQS), wherein the list is based on at least one image parameter selected from the group consisting of: emotion of at least one object, scenery in image, and context of image.

* * * * *